(12) United States Patent
Bretz

(10) Patent No.: US 10,954,064 B2
(45) Date of Patent: Mar. 23, 2021

(54) METHOD FOR STORING AND RETRIEVING OBJECTS, AND STORAGE SYSTEM FOR CARRYING OUT THE METHOD

(71) Applicant: WRH WALTER REIST HOLDING AG, Ermatingen (CH)

(72) Inventor: Markus Bretz, Herrliberg (CH)

(73) Assignee: WRH WALTER REIST HOLDING AG, Ermatingen (CH)

( * ) Notice: Subject to any disclaimer, the term of this patent is extended or adjusted under 35 U.S.C. 154(b) by 184 days.

(21) Appl. No.: 15/828,530

(22) Filed: Dec. 1, 2017

(65) Prior Publication Data

US 2018/0178979 A1 Jun. 28, 2018

(30) Foreign Application Priority Data

Dec. 1, 2016 (CH) ........................... 1577/16

(51) Int. Cl.
*B65G 1/04* (2006.01)
*B65G 1/137* (2006.01)
*B65G 47/90* (2006.01)

(52) U.S. Cl.
CPC ......... *B65G 1/0407* (2013.01); *B65G 1/0485* (2013.01); *B65G 1/1378* (2013.01); *B65G 47/90* (2013.01)

(58) Field of Classification Search
CPC ................ B65G 1/0407; B65G 1/0435
See application file for complete search history.

(56) References Cited

U.S. PATENT DOCUMENTS

| 3,463,298 A | 8/1969 | Harrison | |
|---|---|---|---|
| 3,792,785 A * | 2/1974 | Weir | B65G 1/0407 414/278 |
| 7,261,509 B2 * | 8/2007 | Freudelsperger | B65G 1/0407 414/269 |
| 8,616,822 B2 * | 12/2013 | Winkler | A47F 10/00 211/151 |

(Continued)

FOREIGN PATENT DOCUMENTS

| CH | 425635 | 11/1966 |
|---|---|---|
| CH | 710 608 A1 | 7/2016 |

(Continued)

OTHER PUBLICATIONS

EPO, Form EPO Form 1503 03.82, Extended EP Search Report for European Patent Application EP 17 20 4231, Apr. 4, 2018 (3 pp.) together with EPA Form 1703 01.91TRI (4 pp.).

(Continued)

*Primary Examiner* — Jonathan Snelting
(74) *Attorney, Agent, or Firm* — Pauley Erickson & Swanson

(57) ABSTRACT

A storage system (10) comprises a plurality of storage areas (39) for receiving stored goods, the storage areas being situated in at least one storage level and being accessible by an associated handling device (19, 20, 21) to store stored goods at the storage areas (39) or retrieve them from these storage areas (39). Quicker, simplified storage and retrieval is achieved in that for storing and retrieving the stored goods, in addition a conveyor (15) is provided which is designed as a continuous conveyor and is led on a storage level through the arrangement of the storage areas (3).

20 Claims, 9 Drawing Sheets

(56) References Cited

U.S. PATENT DOCUMENTS 8,998,554 B2 * 4/2015 Toebes .................. B65G 1/04
414/273

FOREIGN PATENT DOCUMENTS

| | | |
|---|---|---|
| CH | 710 660 A1 | 7/2016 |
| CH | 710 851 A1 | 9/2016 |
| DE | 25 10 147 A1 | 9/1976 |
| DE | 26 11 556 A1 | 9/1976 |
| DE | 195 09 951 A1 | 9/1996 |
| DE | 197 21 850 A1 | 5/1998 |
| DE | 299 00 899 U1 | 8/2000 |
| DE | 10 2004 063 588 A1 | 7/2006 |
| DE | 10 2005 045 971 A1 | 4/2007 |
| DE | 10 2007 016 453 A1 | 10/2008 |
| DE | 20 2008 010 880 U1 | 12/2008 |
| DE | 20 2008 010 881 U1 | 12/2008 |
| DE | 10 2008 027 376 A1 | 12/2009 |
| DE | 10 2009 017 241 A1 | 10/2010 |
| DE | 10 2010 010 433 A1 | 9/2011 |
| EP | 0 654 425 A1 | 5/1995 |
| EP | 1 767 472 A1 | 3/2007 |
| EP | 2 393 736 A1 | 12/2011 |
| FR | 2 115 486 A1 | 7/1972 |
| JP | S 52-44978 A | 4/1977 |
| WO | WO 94/06708 A1 | 3/1994 |
| WO | WO 95/23750 A1 | 9/1995 |
| WO | WO 03/019425 A1 | 3/2003 |
| WO | WO 2010/017873 A1 | 2/2010 |
| WO | WO 2014/075937 A1 | 5/2014 |

OTHER PUBLICATIONS

SSI Schafer,"Storage and Retrieval Machines for Pallets, Totes, Cartons and Trays," ISO 9001:2008, No. 07908/0, Nr. 22042014en, Jul. 2009, (12 pages).

* cited by examiner

METHOD FOR STORING AND RETRIEVING OBJECTS, AND STORAGE SYSTEM FOR CARRYING OUT THE METHOD

CROSS-REFERENCE TO RELATED APPLICATIONS

Swiss Patent Application 01577/16, filed 1 Dec. 2016, the priority document corresponding to this invention, to which a foreign priority benefit is claimed under Title 35, United States Code, Section 119, and its entire teachings are incorporated, by reference, into this specification.

BACKGROUND OF THE INVENTION

Field of the Invention

The present invention concerns the field of storage technology. The present invention relates to a method for storing and retrieving objects. Moreover, the present invention relates to a storage system for carrying out the method.

Discussion of Related Art

When a plurality of various objects or goods must be kept in a warehouse, and retrieved as needed and then forwarded, usually for order picking, the warehousing must be cost-effective, and the storage and retrieval must preferably take place automatically and quickly in order to be economically viable.

For this reason, in the past many different approaches have been proposed and implemented in order to meet these requirements.

The publication DE 25 10 147 A1 discloses a method and a device for storing and retrieving goods in warehouses, in particular for a rapid turnover of large quantities of goods, in which the warehouses are preferably equipped with rack channels that occupy the entire length and height of the warehouse, wherein the goods to be stored are each sorted in fairly large quantities according to their differences, and then transported to a first of mutually cooperating, continuously driven conveying means, automatically received by same via central control, and taken, via further conveying means, into rack channels provided for them, wherein only identical goods are stored in the individual rack channels, and the retrieval of the goods takes place in a reverse operation with the same conveying means, but preferably only to likewise automatically and continuously operating conveying means, used only for retrieval, at the rear side of the rack channels, wherein the goods, which are different in each case, are retrieved individually but uninterruptedly from the rack channels in question and combined on a loading area to be transported away.

The publication WO 94/06708 A1 describes a warehousing system for storage and retrieval, in particular of large-volume stored goods such as containers and the like, having at least one, preferably multiple, storage levels, the storage levels being made up of individually operable, continuously circulating horizontal conveyors that run in parallel to one another and have storage locations for the stored goods, wherein the front and rear ends are approximately aligned with one another, and at least two transport devices for the stored goods, situated transversely with respect to the longitudinal extension or running direction of the horizontal conveyors, are associated with each storage level, wherein one of the transport devices is situated in front of the front end, and the other behind the rear end, and the transport devices move the stored goods transversely with respect to the horizontal conveyors, and may individually receive stored goods from or transfer stored goods to the horizontal conveyors.

The publication EP 0 654 425 A1 discloses a method for storing or retrieving, or restacking carriers with conveyed goods of different dimensions, in particular loaded or unloaded freight containers into or out of a multi-tier warehouse, using at least one rack conveyor unit that is movable in an aisle of the warehouse, and at least one rack side, situated next to the aisle, having storage locations for storing the carriers for conveyed goods at the end positions, wherein, after positioning the loaded or unloaded carrier for conveyed goods on the rack conveyor unit in a position of the carriers corresponding to the end position in a rack compartment, the carrier is deposited at the correct location in the rack compartment by the rack conveyor unit.

The publication DE 299 00 899 U1 discloses a storage system for a goods distribution center, in particular for foods and retail goods, the storage system having a goods inlet, a goods outlet, and one or more high racks for accommodating carriers for the goods, and the storage system having at least one automatic rack storage and retrieval unit for handling the carriers, and at least one adjoining automatic separation unit for the goods.

The publication DE 10 2005 045 971 A1 describes a method for order picking in a picking system, having conveyor connections to a shipping area and to an article warehouse in which various articles are each stored in article containers, having at least one picking station to which article containers are transported back and forth for the purpose of order-specific removal of articles by means of conveying devices, the article containers in each case being supplied to the picking station in a sequence that is specified for picking the orders, and also having at least one buffer store in the immediate vicinity of the picking station for customer bins in which the removed articles are deposited according to the order, the buffer store being connected on the one hand to the shipping area and on the other hand to the picking station via second conveying devices, and having a feed device at the picking station for empty customer bins, and having a discharge device for finished picked customer bins; to ensure an interruption-free picking operation at the at least one picking station, the article containers and the customer bins are supplied to the particular picking station and discharged from same in a time-controlled manner in such a way that, at least during extended operating phases, in particular over the entire operating period, at least one customer bin to be filled, and at least one article container that contains at least one article that is still needed for the order associated in each case with the at least one customer bin, are continuously available at the picking station, in each case in the working position.

The publication DE 20 2008 010 880 U1 relates to a picking system having an automated picking unit and an attached dynamic storage rack as a reserve for refilling the automated picking unit with piece goods, having at least one driven conveyor line, preferably in the form of an accumulating roller conveyor, at least one dynamic storage rack with inclined flow channels in multiple rack tiers, preferably three to five rack tiers whose outlets are reachable by an operator, in each case having a displaceable, track-guided tier control unit in each rack tier for automatically filling the flow channels with containers/cartons that preferably contain type-sorted piece goods, having at least one stationary elevator in a connection to the conveyor line for automatically transporting the containers/cartons from the conveyor line into each selected rack tier, and having a buffer section in each rack tier in a connection to the elevator for automatically receiving the containers/cartons from the elevator, whose outlet is automatically accessible by the tier control unit, wherein the tier control unit in each case may receive a container/carton for horizontal transport to the inlet of a selected flow channel.

The publication DE 20 2008 010 881 U1 discloses a shipping rack, preferably in a picking system for receiving and delivering containers, having ramps that are situated next to and above one another, the outlets of which are reachable manually by an operator, and on the filling side of which feeding and filling devices are situated, wherein adjacently situated ramps in each case form a rack tier of the shipping rack, wherein an elevator of the shipping rack is adjoined by a container feed section that transports a supplied container to a selected rack tier, and in each rack tier a dedicated track-guided tier control unit that is movable transversely with respect to the inlets of the ramps is provided for transporting the supplied container to a selected ramp and filling the selected ramp with the supplied container.

The publication DE 10 2008 027 376 A1 proposes a device for storing and retrieving goods, in particular medicament packages, having at least one provisioning station on which the goods are provided, having at least one rack with storage areas for storing the goods, and having at least one rack storage and retrieval unit for accessing the provisioning station and the storage areas, the rack storage and retrieval unit having at least one pickup device for picking up one or more of the goods, and controller-automated cleaning or preparation for cleaning of the storage facility, the goods, or the picking device.

The publication WO 2010/017873 A1 describes a method for manually picking piece goods in a picking system, with a dynamic storage rack as a reserve for manual picking, wherein the piece goods, preferably type-sorted, are automatically transported in containers or cartons on a driven conveyor line to the dynamic storage rack, and after reading and recognition are automatically introduced via a controlled stationary elevator and controlled tier control units of the dynamic storage rack in selected flow channels of the dynamic storage rack with outlets that are manually reachable by a picking operator, and piece goods from a container/carton at a selected outlet of a flow channel are supplied on an order-specific basis to a provided order container by the picking operator at his/her picking workstation.

The publication DE 10 2009 017 241 A1 discloses a storage system for accommodating goods in storage positions that are accessible by operating vehicles, the storage facility being equipped with storage positions situated in horizontal tiers that may be acted on by operating units via horizontal operating levels with vertical access.

A similar system is also known from the publication WO 2014/075937 A1.

In particular, a rack storage and retrieval unit is also known from the publication DE 10 2004 063 588 A1 for storing and retrieving unitized load carriers in and out of a high rack warehouse, having a chassis for horizontal movement within a rack aisle of the high rack warehouse, having a lifting platform which is movable on a vertical guide and which is provided with a single transfer unit for storing and retrieving a load carrier into and out of a storage bin of the high rack warehouse, and having an electronic controller that controls the drives of the rack storage and retrieval unit, wherein the lifting platform for transporting load carriers between the storage area, the storage bin, and the retrieval area of the high rack warehouse is provided with a buffer store for accommodating at least one load carrier in addition to the load carrier that is accommodatable in the area of the transfer unit, the buffer store being designed in such a way that for storage in the high rack warehouse, the at least one additional load carrier is transferable into the work area of the transfer unit, and conversely, for retrieval, is transferable from the work area of the transfer unit into the buffer store.

The publication CH 710 851 A1, to which reference is made below, relates to a sorting conveyor for conveying and delivering conveyed goods, containing a conveying unit which is movable along a closed conveyor path and which has a conveyor car and a tilting conveyor element, situated on the conveyor car, which may be tipped into a tilted position for delivering a conveyed good from a loading position into a tilted position, the sorting conveyor forming a loading zone along the conveyor path, and a delivery zone, directly following the loading zone in the conveying direction, having at least two delivery stations. The tilting conveyor element is tiltable toward a first tilting side into a first tilted position, and toward a second tilting side into a second tilted position. The sorting conveyor, after the loading zone and in front of the delivery zone (viewed along the conveyor path in the conveying direction), includes a tilting zone having a tilting device for tipping the tilting conveyor element into the first or second tilted position.

DE 102010010433 A1 discloses a rack system for storing and retrieving stored goods for a picking system, having a rack with at least one rack block, each rack block having multiple rack levels situated one on top of the other, each having a plurality of horizontally adjacent rack storage areas for in each case temporarily storing a stored good in the rack. A vertically and horizontally movable rack storage and retrieval unit is situated on a longitudinal side of the rack in order to use its load pickup means to deliver a stored good to one of the rack storage areas or to pick up a stored good from one of the storage areas, the rack storage and retrieval unit being able to approach each rack storage area along the longitudinal side of the rack for the purpose of carrying out a stored good transfer. A horizontally oriented stored good conveyor system extends essentially in parallel to the rack levels, and runs above and/or below each rack block and adjacent to each rack block. Since each rack block comprises only one vertical layer, the utilization of the volume of such a rack system is comparatively poor.

DE 102007016453 A1 discloses an automated picking system with which item units may be transported to a work station in a predetermined sequence, having a storage rack with a plurality of storage areas for accommodating storage units on or in which item units, preferably type-sorted, are stored. The storage rack is divided into rack zones, each rack zone having a plurality of rack levels, each of which includes a plurality of adjacently situated storage areas. A central conveyor belt is situated along the longitudinal side, between two storage racks. Multiple central conveyor belts may also be situated one on top of the other. Multiple vertical elevators are situated in succession on the longitudinal side of the storage rack, each having a load pickup means for picking up and delivering at least one storage unit. A plurality of horizontally movable stock machines are situated between two vertical rack levels in order to remove storage units from the rack and deposit them at a transfer station, where the storage units may be received by an association vertical elevator. The vertical elevators bring the goods to the level of the central conveyor, where the storage units are horizontally conveyed from conveyor paths to the central conveyor. The storage units are deposited on the central conveyor belt in a predetermined sequence to obtain a sorted combination of a picking order. This automated picking system has a very complex design, with a plurality of different moving units that must interact.

Despite a number of known proposed solutions for designing and operating a high rack warehouse, there is still a need for a warehouse that, with a comparatively simple design, on the one hand allows rapid, targeted storage and on the other hand facilitates efficient retrieval with particular advantages for subsequent order picking of the stored goods.

SUMMARY OF THE INVENTION

It is therefore an object of the invention to provide a storage system that meets this need, and in particular in conjunction with order picking of the retrieved goods allows rapid operation with simplified combination of the goods.

A further object of the invention is to provide a method for operating such a storage system.

The object is achieved by the features of Claims 1, 16, and 17. Further advantageous embodiments are set forth in the dependent claims.

The achievement of the object according to the invention may be further improved by various embodiments which are each advantageous on their own, and, unless stated otherwise, arbitrarily combinable with one another. These embodiments and their associated advantages are discussed below.

The storage system according to the invention comprises a plurality of storage areas for receiving stored goods, the storage areas being situated in at least one storage level and being accessible by an associated handling device in order to store stored goods at the storage areas or retrieve them from these storage areas.

The storage system according to the invention is characterized in that for storing and retrieving the stored goods, in addition a conveyor is provided which is designed as a continuous conveyor and forms a continuously closed loop, and which is led on at least one storage level through the arrangement of the storage areas.

This allows more rapid, simplified storage and in particular retrieval of the stored goods.

In conjunction with the description of the invention, a continuously closed loop of a conveyor is understood to mean a transport path of a conveyor in which an object on the conveyor, starting from an origin point, after transport is continuously conveyed along the transport path and arrives back at the origin point, i.e., may be transported in continuous circulation. The transport path may extend horizontally, but may also contain positive and negative slopes, spirals, loops, topological nodes, etc.

One embodiment of the storage system according to the invention is characterized in that the storage system includes at least one picking unit for individually combining retrieved stored goods, and the conveyor at the picking unit is led along or through the picking unit. In the picking unit, various retrieved goods may be combined in a known manner to form a shipment, so that the goods are then further processed, for example shipped, together. In the picking unit, multiple picking stations may be situated in succession in the running direction of the conveyor, and are then all served by the one conveyor. This results in a significant simplification of the conveying logistics overall.

The storage system may also have at least one transfer station for the intake of stored goods to be stored in the storage system, the conveyor at the transfer station being led along or through the transfer station. However, in the case of a picking unit with corresponding picking stations, it is also conceivable to use and/or reconfigure one or more of these picking stations for the intake of stored goods to be stored.

In principle, the interplay according to the invention of handling devices and conveyors may be implemented in a storage system in which the various storage areas are distributed on only a single storage level. The conveyor is then led through the storage system at this storage level, and the handling devices provide for distribution of the stored goods in the level or lead the stored goods to be retrieved, starting from the storage areas, to the conveyor. However, it also conceivable for multiple such levels to be situated one on top of the other and to be served by appropriate handling devices.

In particular, the storage areas may be situated on superposed storage levels in high racks that are spaced apart from one another to form rack aisles, wherein horizontally and vertically movable rack storage and retrieval units are provided in the rack aisles, between the high racks, as handling devices, and via which each of the storage areas may be accessed for storing and/or retrieving stored goods, and wherein the conveyor is led at least once through the high racks on a storage level.

The conveyor traveling through all areas of the high rack warehouse collects all retrieved stored goods or items on a single conveyor line and transports them to a certain location in front of the warehouse for further processing, for example picking. For this purpose, the stored good is picked up from the accessed storage areas by the rack storage and retrieval units and transported on the conveyor. By skilled control of these operations, the sequence of the retrieved stored goods or items may be selected, while still on the conveyor, in such a way that during the further processing (picking) they are available at the particular picking stations in a time-saving ordered sequence.

At the same time, due to its length the conveyor may be available and be used as buffer storage so that stored goods, which during daily further processing must be available quickly, may be retrieved beforehand on the storage belt at night, for example, and thus be quickly provided.

In the case of high rack warehouses, the storage and retrieval process may be designed in a particularly time-saving manner when the storage levels through which the conveyor is led are situated at approximately one-half the height of the high racks. In this case, long paths for the rack storage and retrieval units are avoided.

In one refinement of the invention, in a storage level the high racks may in each case have two storage areas situated one behind the other, transverse to the rack aisle, wherein the conveyor is led on the particular storage level through the particular high rack, in parallel to the rack aisle, and in the storage levels on which the conveyor is led through the particular high rack, only one row of storage areas is provided next to the conveyor. In this way the conveyor itself may be optimally integrated into existing high racks without having to make major modifications to the rack itself. In particular, the rack aisles remain open, so that at that location the rack storage and retrieval units may access all storage areas unhindered. At the same time, the entire length of the storage level in the running direction of the conveyor is available for exchanging the stored goods between the conveyor and the storage level.

The handling devices are preferably designed and configured in such a way that they may pick up stored goods from each of the storage areas and transfer them to the conveyor. In this way, due to the interplay between the conveyor and the handling devices, all storage areas of the storage system may be quickly and easily selected and used for the retrieval.

In addition, for transferring stored goods from a handling device to the conveyor, at least one intermediate conveyor may be provided which receives the stored goods from the rack storage and retrieval unit and further transports them on the conveyor. A belt conveyor, for example, may be considered as an intermediate conveyor. The at least one intermediate conveyor may, in principle, manage without a drive, but in particular may also be drivable.

For storing stored goods, the handling devices may be designed and configured in such a way that they may receive stored goods from the conveyor and transport them to each of the storage areas of the storage system and deposit them there. In this way, due to the interplay between the conveyor and the handling devices, all storage areas of the storage system may be quickly and easily selected and used for the storage.

In particular, the conveyor may include a continuously circulating conveyor chain that forms a continuously closed loop, to which devices for receiving stored goods may be fastened. Such a chain conveyor, for example a plate chain conveyor, mat chain conveyor, shoe conveyor, tray conveyor, or cross belt conveyor, allows robust and trouble-free operation of the system, even under fairly heavy loads. However, the conveyor chain may also be made up of individual interlinked conveyor cars. For receiving stored goods, the devices may include plates situated on the top side of the conveyor chain, one behind the other in the running direction, preferably with an overlap, on which the stored goods may be deposited for transport.

However, for receiving stored goods, the devices may also include transport trays situated on the top side of the conveyor chain, one behind the other in the running direction of the conveyor chain, on which the stored goods may be deposited for transport.

In particular, the devices may be designed in such a way that stored goods situated therein are unloadable transversely, in particular laterally, with respect to the conveying direction.

It may also be provided that the devices may be laterally tilted. Particularly simple, gravity-assisted unloading is made possible in this way. To assist with dumping, skids may additionally be situated in the rack, on which the dumped stored good slides to its storage area.

The handling devices for storing and retrieving stored objects advantageously include a transfer device with which a stored object may be received from a storage area, or the stored object may be placed at a storage area. Various options from high rack technology, for example, are known for this purpose. However, the most advantageous selection of the transfer device in the specific case depends on the type of storage container or stored object, and the storage system.

For stored objects that do not have a standardized shape, such as packages, the storage into a storage system is more difficult. The same also applies for receiving such stored objects from the conveyor or transferring the stored objects to the conveyor. It is likewise more difficult to handle stored objects, regardless of their shape, in conveying systems in which the position and orientation of the conveyed stored objects are not predefined and may vary. One example is a transport belt in which not only the position, but also the orientation of the stored object on the transport belt may shift during transport.

In one advantageous variant of a storage system according to the invention, the handling device includes a robotic device. This has the advantage in particular that a precise, regular arrangement of the transported stored objects is not necessary, since the robot arm may adjust the actual position orientation of the stored object on the conveyor or at the storage area, using appropriate sensors, in particular optical sensors.

A transfer unit, in particular a robotic device, may also include means for identifying a stored object, for example sensors for reading out RFID elements or for reading labels or one- or two-dimensional codes, for example barcodes or QR codes. This allows, for example, the identity of a certain stored object to be checked prior to the storage and retrieval.

The method according to the invention for operating a storage system according to the invention, in the general case, is characterized in that for storing stored goods in the storage system, the stored good is transported via the conveyor into the storage level associated with the conveyor, and at that location is deposited on a storage area, and is received by a handling device as needed and transferred to a different storage area, and for retrieving stored goods, the stored good is transported via a handling device from its storage area into a storage level associated with the conveyor, and at that location is placed on the conveyor.

In the case of the high rack warehouse, the method according to the invention for operating the storage system is characterized in that, for storing stored goods in the storage system, the stored good is transported via the conveyor into the storage level of the particular high rack associated with the conveyor, and at that location is deposited in the high rack, and as needed is transferred via one of the handling devices into a different storage level and/or a different high rack, and for retrieving stored goods, the stored good is transported via one of the handling devices from its storage area in the high rack into a storage level associated with the conveyor, and at that location is placed on the conveyor.

In addition, for retrieving stored goods, the stored good may be initially deposited via one of the handling devices at an intermediate station in the storage level associated with the conveyor. Such an intermediate station may in particular be an intermediate conveyor which then also takes over the further transport of the stored good on the conveyor.

It may be advantageous when the stored good is transferred from the intermediate station to the conveyor in an ordered manner. An ordered transfer includes in particular that the stored good is deposited at a predetermined location on the conveyor.

Due to the interplay between the conveyor and the handling devices, a rapid, targeted storage and retrieval process is made possible which may be implemented even with existing storage facilities or high rack warehouses.

One embodiment of the method according to the invention is characterized in that the retrieved stored good is transported via the conveyor to a picking unit, where it is removed from the conveyor and further processed within the scope of a picking operation.

In addition, due to its length the conveyor may advantageously be used for temporarily storing stored goods to be stored and/or retrieved.

It is also conceivable for the retrieved stored good to be temporarily stored on the conveyor in a sequence that is optimized for the subsequent picking operation. In this case, the handling devices are controlled in such a way that the stored goods that they deposit on the conveyor are already placed in the desired sequence.

For storing the stored goods, standardized storage containers may be used in which the stored goods are stored in the storage system, and for storage or retrieval the storage containers are removed from the storage areas in the high racks by the handling devices, by means of the conveyor are transported for loading or unloading, and after the loading or unloading are returned to one of the storage areas. Goods that are identical or also different may be kept in the storage containers, and are stored in preferred storage areas, depending on the frequency of the stock turnover.

For dropping the stored good onto a storage area from the conveyor, the stored good may be unloaded transversely, in particular laterally, with respect to the conveying direction.

In addition, the stored good may be dropped onto a storage area from the conveyor by gravity-assisted tilting and dumping. This is the case in particular when devices as described in the above-cited publication CH 710 851 A1, for example, are present on the conveyor.

The stored good is advantageously transferred in an ordered manner from the intermediate station to the conveyor.

In all of the described embodiments of a storage system or method according to the invention, the conveyor may also be used for rearranging storage containers between various rack aisles, for example to achieve a distribution of the storage containers over the entire storage system that is uniform or optimal for short access times. For this purpose, the storage and retrieval units may remove storage containers from a specific rack aisle and deposit them on a circulating conveyor, so that after reaching another specific rack aisle they may be picked up by the storage and retrieval unit at that location and deposited at a new storage area.

Such optimization processes may be carried out separately from the normal operation, for example at off-peak times, or also concurrently with normal operation by making use of gaps in the capacity utilization of the conveyor or the storage and retrieval unit, in order to rearrange storage containers without effects on normal operation.

BRIEF DESCRIPTION OF SEVERAL VIEWS OF THE DRAWINGS

The invention is explained in greater detail below with reference to exemplary embodiments in conjunction with the figures. The following examples are provided for better explanation of the present invention, but should not be construed as limiting the invention to the features disclosed herein.

DETAILED DESCRIPTION OF THE INVENTION

In principle, the interplay according to the invention of handling devices and conveyors in a storage system may be achieved in which the various storage areas are distributed on only a single storage level. The conveyor is then led through the storage system at this storage level, and the handling devices provide for distribution of the stored good in the level, or lead the stored good to be retrieved, starting from the storage areas, to the conveyor. Although the invention is explained below in particular using a high rack warehouse as an example, it is also conceivable for multiple such levels to be situated one on top of the other and to be served by appropriate handling devices.

Figure 1:
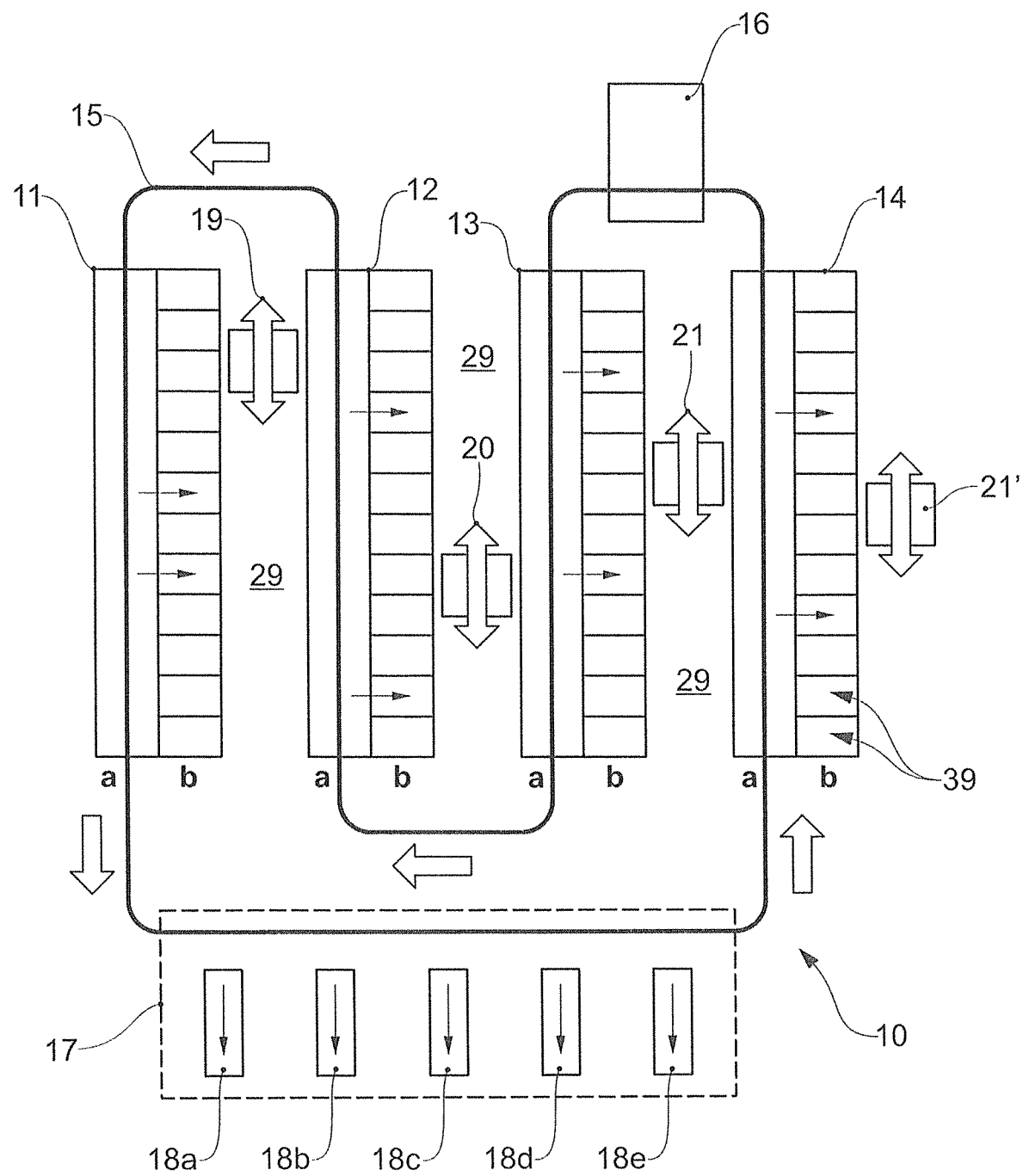
FIG. 1 shows a schematic illustration, in a plan view from above, of a storage system according to one exemplary embodiment of the invention, having four high racks through which a continuous conveyor, which cooperates with rack storage and retrieval units in the rack aisles between the high racks, is led.

FIG. 1 shows a schematic illustration, in a plan view from above, of a storage system 10 according to one exemplary embodiment of the invention, having four high racks 11, 12, 13, and 14 through which a continuous (closed) conveyor 15 is led, which cooperates with rack storage and retrieval units 19, 20, and 21 in the rack aisles 29 between the high racks 11, 12, 13, and 14. FIG. 1 shows a section of a particular level (approximately in the middle) of the high rack warehouse, in which the conveyor is led through the high racks 11, 12, 13, and 14. It is apparent that the conveyor forms a continuously closed loop. A further rack storage and retrieval unit 21', for example, may be provided outside the rack aisles 29 when the external storage areas 39 are not otherwise accessible.

The conveyor 15 has a preferred conveying or running direction marked by the arrows, and leads, in particular outside the actual warehouse, through a picking unit 17, situated in front of the warehouse, in which withdrawn or retrieved items or stored goods are removed from the conveyor 15 at individual transfer stations or picking stations 18a through 18e and further processed, for example combined into goods shipments or goods deliveries. In principle, however, the conveyor 15 may also be operated in the other direction or in alternating directions. The necessary drive and the associated controller for the conveyor 15 are not shown in FIG. 1 for the sake of simplicity.

For storing the goods in the high racks 11, 12, 13, and 14, at another location on the conveyor 15 a transfer station 16 may be provided, via which stored goods may be placed on the conveyor 15 and transported by means of the conveyor 15 into a high rack that is selected for this purpose. At that location the stored good is unloaded from the conveyor 15, and may be deposited on a storage area 39, provided for this purpose, in the rack by an associated rack storage and retrieval unit 19, 20, or 21, and thus stored. It is conceivable for the stored good to be directly transported and deposited, or transported and kept in a suitable container (for example, a box or a case, on a pallet, or in a basket or container), optionally together with other similar or different goods. However, one or more of the picking stations 18*a* through 18*e* may also be used for the storage if they are not needed at that moment for picking, for example.

When a stored good is to be retrieved from any of the storage areas 39 situated on various storage levels (LE in FIG. 2), one of the rack storage and retrieval units 19, 20, 21 that is able to access this storage area approaches the storage area, picks up the stored good that is stored there, with the transfer device 57 at that location, and transports it to a section of the conveyor 15 to which it has access, and places it there on the conveyor 15.

When a stored good is to be stored at any of the storage areas 39 situated on various storage levels (LE in FIG. 2), one of the rack storage and retrieval units 19, 20, 21 that is able to access this storage area picks up the stored good transported by the conveyor 15 and deposits it there.

In the exemplary embodiment shown in FIG. 1, each of the high racks 11, 12, 13, and 14 has two rack halves a and b extending in parallel to the rack aisles 29. When a stored good is to be retrieved for picking, for example from a storage area 39 in rack half b of the high rack 13, the rack storage and retrieval unit 21 approaches this storage area situated on the left, removes the desired stored good, travels at the level of the conveyor 15, and then transfers the removed stored good through rack half a of the high rack 14 to the conveyor 15 that is led on the right side. Other storage areas in other high racks are correspondingly served by other rack storage and retrieval units.

Figure 2:
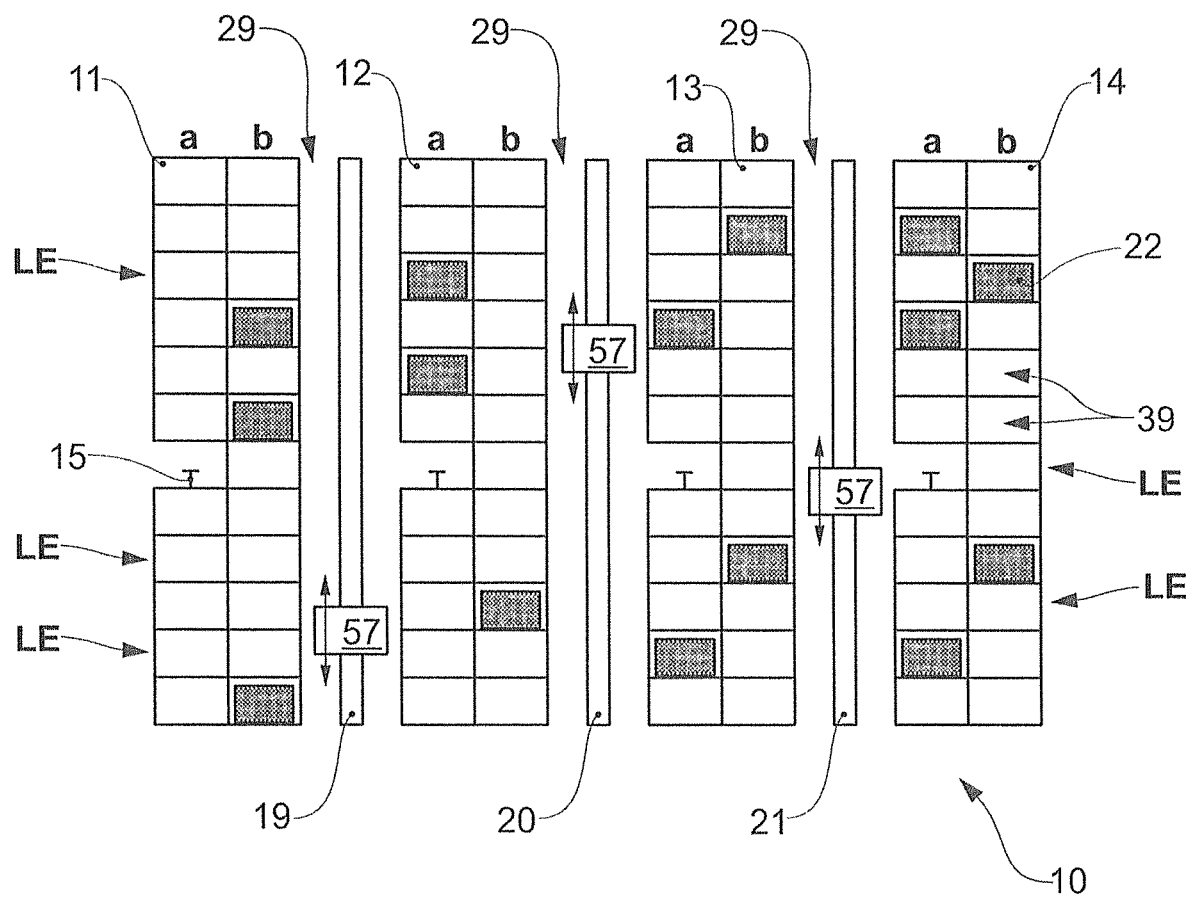
FIG. 2 shows the storage system from FIG. 1 in a simplified view from the front.

FIG. 2 shows the storage system 10 from FIG. 1 in a simplified view from the front. It is apparent here that the rack storage and retrieval units 19, 20, and 21 are movable not only in the longitudinal direction in their rack aisle 29, but naturally also high enough vertically that they are able to reach all storage levels LE on the adjoining high racks and access the storage areas 39 there. Also shown in FIG. 2 are corresponding storage containers 22, at various storage levels and storage areas, in which the stored goods are kept. FIG. 2 also shows that in this example, in all high racks 11, 12, 13, and 14 the conveyor 15 is led through the high racks at the same level (the same storage level LE). In the example, this particular storage level is situated approximately at mid-height of the high racks, so that the rack storage and retrieval units 19, 20, and 21, starting from the conveyor 15, have to cover approximately the same path length from the very bottom to the very top storage level. However, it is also conceivable to lead the conveyor 15 through the rack in various high racks at various storage levels. It is also conceivable to keep storage levels other than the middle storage levels free for leading the conveyor 15 through in a rack half (in rack halves a in FIGS. 1 and 2).

Figure 3:
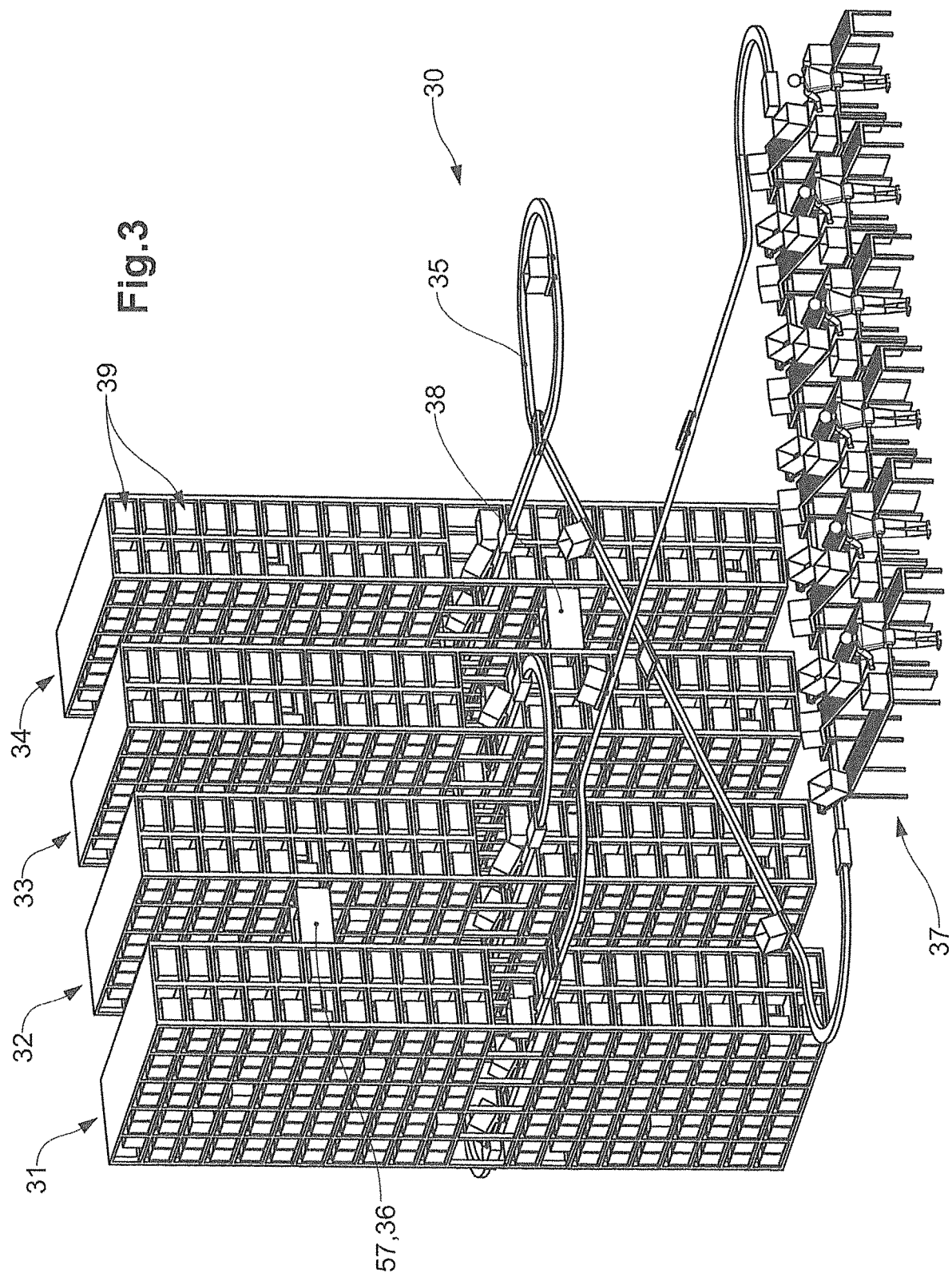
FIG. 3 shows a perspective view of a storage system according to another exemplary embodiment of the invention, with a picking unit illustrated in detail.

FIG. 3 shows a perspective view of a storage system 30 according to another exemplary embodiment of the invention, with a picking unit 37 depicted in detail. The storage system 30 once again includes four high racks 31, 32, 33, and 34, between which rack storage and retrieval units 36, 38 are movably situated in the rack aisles. The conveyor 35 is also guided here through the high racks at a middle storage level, and forms a continuously closed loop. In addition, in this exemplary embodiment the length of the conveyor 35 is greatly increased by forming turning loops and the like. This has the result, among other things, that the entire length of the conveyor 35 may be used as optional storage space for retrieved goods or goods to be stored. It is thus conceivable, at times when no picking takes place in the picking unit 37 (at night, for example), to deposit stored goods on the conveyor 35 in a sequence that is advantageous for the subsequent picking, and when picking begins, the goods may then be further processed without major loss of time. In this way, optimal use may be made of the rack storage and retrieval units 36, 38, and equipment-related time delays may be minimized.

In the example in FIG. 3, the conveyor 35 is equipped with transport trays (denoted by reference numeral 50 in FIG. 7) in which the stored goods (in containers) may be transported, and which are tiltable on both sides in order to unload transported stored goods. The loading of the storage trays 50 is not shown in FIG. 3 for reasons of clarity. For this purpose, the stored goods accommodated in the containers must be lifted over the edge of the tray by the rack storage and retrieval units 36, 38, or, with the side wall open (reference numerals 51, 52 in FIG. 7), pushed into the tray.

Figure 4:
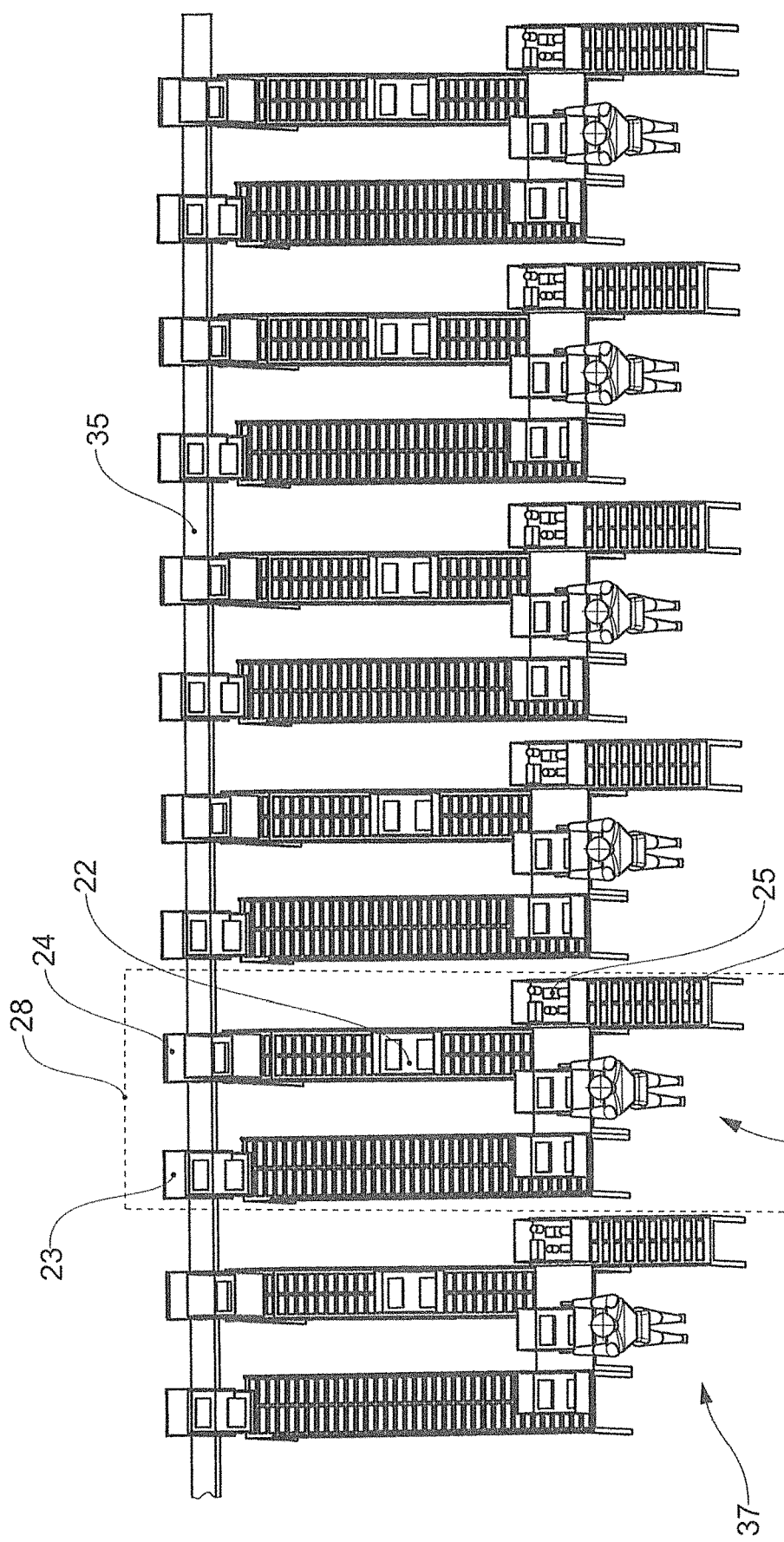
FIG. 4 shows the picking unit from FIG. 3 in a plan view from above.

The picking unit 37 in FIG. 3 is depicted in an enlarged illustration in FIG. 4, in a plan view from above. In the illustrated example, a total of six picking stations 28 are adjacently situated in the picking unit 37, in the running direction of the conveyor 35, and connected to the conveyor 35. A receiving device 23 for receiving the storage containers 22, containing the stored goods, from the conveyor 35 and a transfer device 24 for transferring the emptied storage containers 22 onto the conveyor 35 are situated in parallel to one another within each picking station 28. In the example, the receiving device 23 and the transfer device 24 are designed as roller conveyors, but may also utilize other conveying techniques.

An operator 27 removes the desired goods from the storage container 22 that arrives via the receiving device 23, and then places the storage container 22 on the transfer device 24, which transports the storage container 22 back onto the conveyor 35. The removed goods are collected into a goods combination 25 and then discharged to the outside for further processing, via an output device 26 which likewise may be designed as a roller conveyor. As a whole, the retrieval of the stored good or goods is controlled by a central controller (not shown), which acts on the rack storage and retrieval units 19, 20, 21 and 36, 38 as well as the conveyor 15, 35, in such a way that the desired goods for the particular goods combination 25 are available at the picking stations 28 in a time-coordinated manner.

Figure 5:
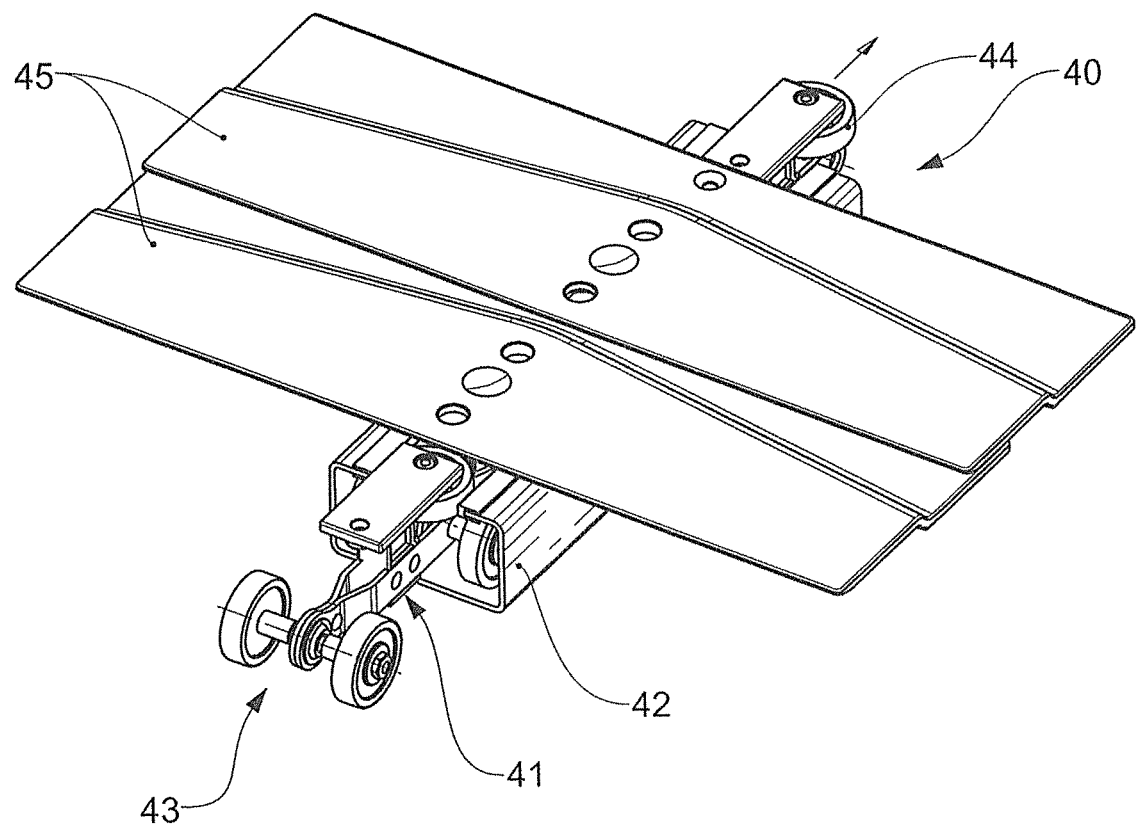
FIG. 5 shows a section of a conveyor having segments fastened to a conveyor chain, as is suitable for implementing the invention.
Figure 6:
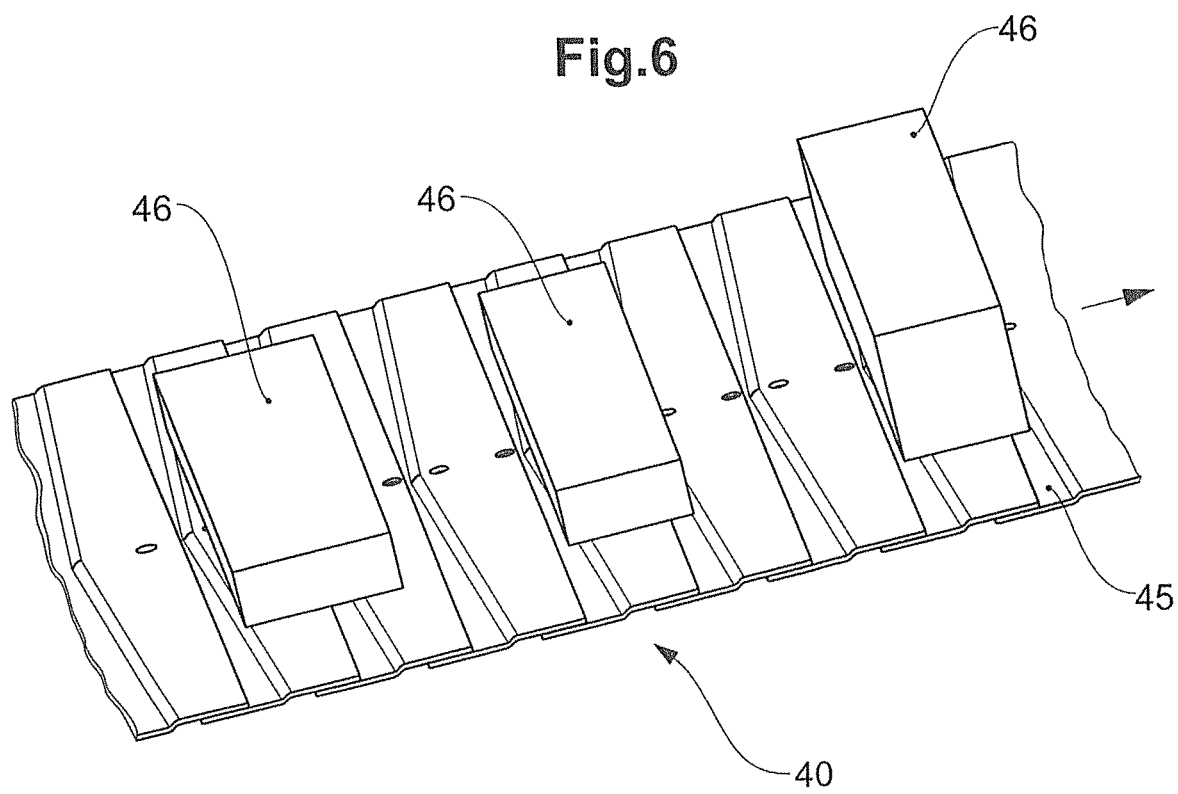
FIG. 6 shows a section of the belt with goods (packages, for example) transported thereon.
Figure 7:
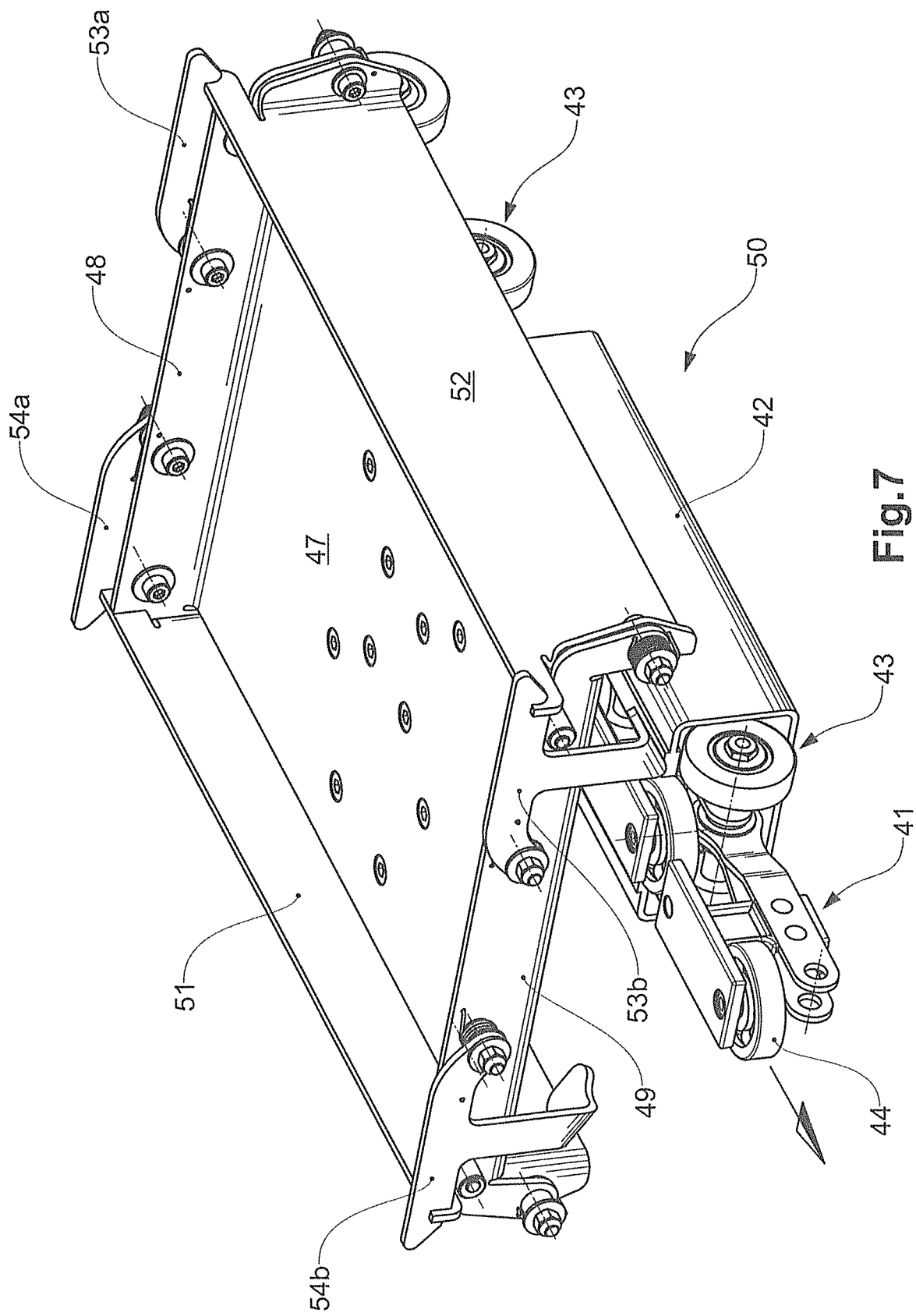
FIG. 7 shows a storage tray that is fastened to a conveyor chain and tiltable on both sides, as is suitable for implementing the invention.

Examples of the specific design of the conveyor 15 or 35 are depicted in FIGS. 5, 6, and 7. Corresponding designs are known from the publication CH 710 851 A1 cited at the outset. In the example in FIGS. 5 and 6, a transport belt 40 is shown as a conveyor, in which a continuous conveyor chain 41 with pairs of track rollers 43 and guide rollers 44 for lateral guiding runs, protected, in a running track 42 that is open at the top. The conveyor chain 41 protruding from the running track 42 at the top bears, on the conveyor chain 41 above the running track 42, centrally screwed-in plates 45 which engage with one above the other in the manner of scales and which form a wide carrier belt and are able to rotate relative to one another in curves. According to FIG. 6, the stored goods, for example in the form of packages 46, may be placed on a transport belt 40 designed in this way, and conveyed from the high racks 31-34 to the picking unit 37.

Another design, also indicated in FIG. 3, uses the transport trays 50 shown in FIG. 7, which are likewise fastened to the top side of the conveyor chain 41 known from FIG. 5. The rectangular transport trays 50 have a flat base 47, and a front wall 49 and a rear wall 48 situated transversely with respect to the running direction. Detent hooks 53 *a, b* and 54 a, b are pivotably mounted on the outside of the front wall 49 and the rear wall 48, and engage behind side walls 51, 52 which may be laterally folded down; the detent hooks may be unlocked, if necessary, by gate elements situated next to the running track 42 when traveled over by the transport tray 50, so that the side wall in question, which is pretensioned by springs, folds down and allows the contents of the transport tray 50 to slide out. For this purpose, the transport tray 50 is tilted toward the unlocked side, as described in greater detail in the publication CH 710 851 A1.

During filling of the transport tray 50, either the stored good to be loaded may be lifted over the closed edge, or the foldable side walls 51, 52 may be unlocked on one or both sides and folded down, and the stored good is then pushed into the tray, after which the side walls are raised up once again and locked.

Figure 8:
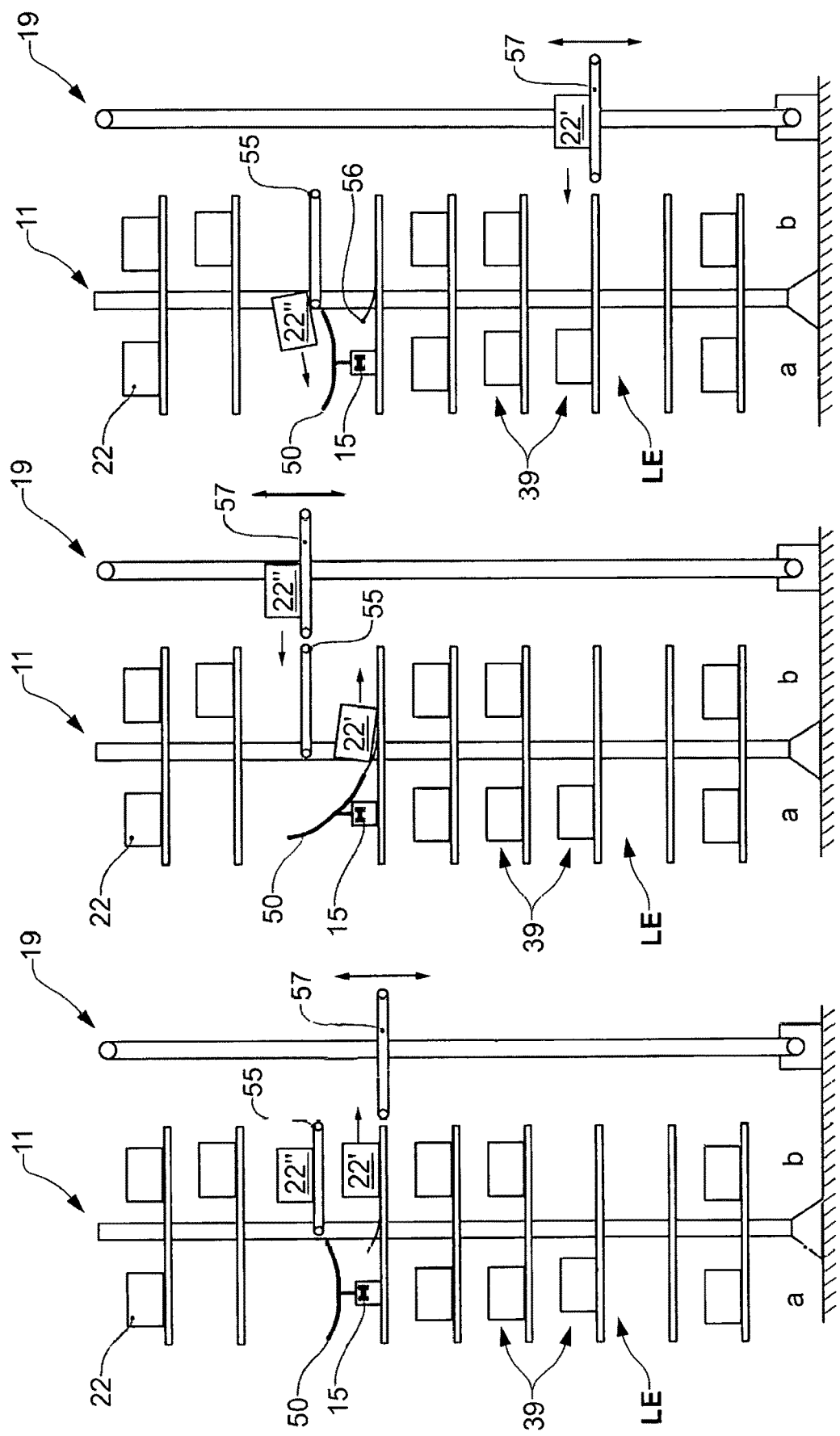
FIG. 8A schematically shows the retrieval of a storage container on a rack storage and retrieval unit.
FIG. 8B schematically shows the storage of a storage container, on the one hand from the conveyor and on the other hand by a rack storage and retrieval unit.
FIG. 8C schematically shows the retrieval of a storage container on the conveyor and the simultaneous storage by means of a rack storage and retrieval unit.

In FIG. 8A, for filling the transport trays 50, an additional belt conveyor 55 is arranged in an intermediate level as an intermediate conveyor. According to FIG. 8B, the belt conveyor 55 may be loaded by the rack storage and retrieval unit 19 with a storage container 22" to be retrieved, which according to FIG. 8C is then loaded via the belt conveyor 55 into the transport tray 50 from above.

For the storage of a storage container 21', a skid (reference numeral 56 in FIG. 8C) may be situated beneath the belt conveyor 55, and when the transport tray 50 is dumped according to FIG. 8B, the skid allows the storage container 22 to slide to a storage area from which, according to FIG. 8A, it may be picked up by the rack storage and retrieval unit 19 in order to be subsequently introduced to a certain storage area (FIG. 8C).

In the exemplary embodiment in FIGS. 8A, 8B, 8C, the transfer device 57, via which a rack storage and retrieval unit 19 receives an object 22 from a storage area in the high rack 11 or places the object 22 at a storage area in the high rack 11, is implemented as a belt conveyor device. However, the most suitable transfer device depends on the type of storage container, and the high rack system.

For stored objects that do not have a standardized shape, such as packages, the storage into a storage system is more difficult. The same also applies for receiving such stored objects from the conveyor or transferring the stored objects to the conveyor. It is likewise more difficult to handle stored objects, regardless of their shape, in conveying systems in which the position and orientation of the conveyed stored objects are not predefined and may vary. One example is the transport belt from FIGS. 5 and 6, in which not only the position, but also the orientation of the stored object on the transport belt may shift during transport.

Figure 9:
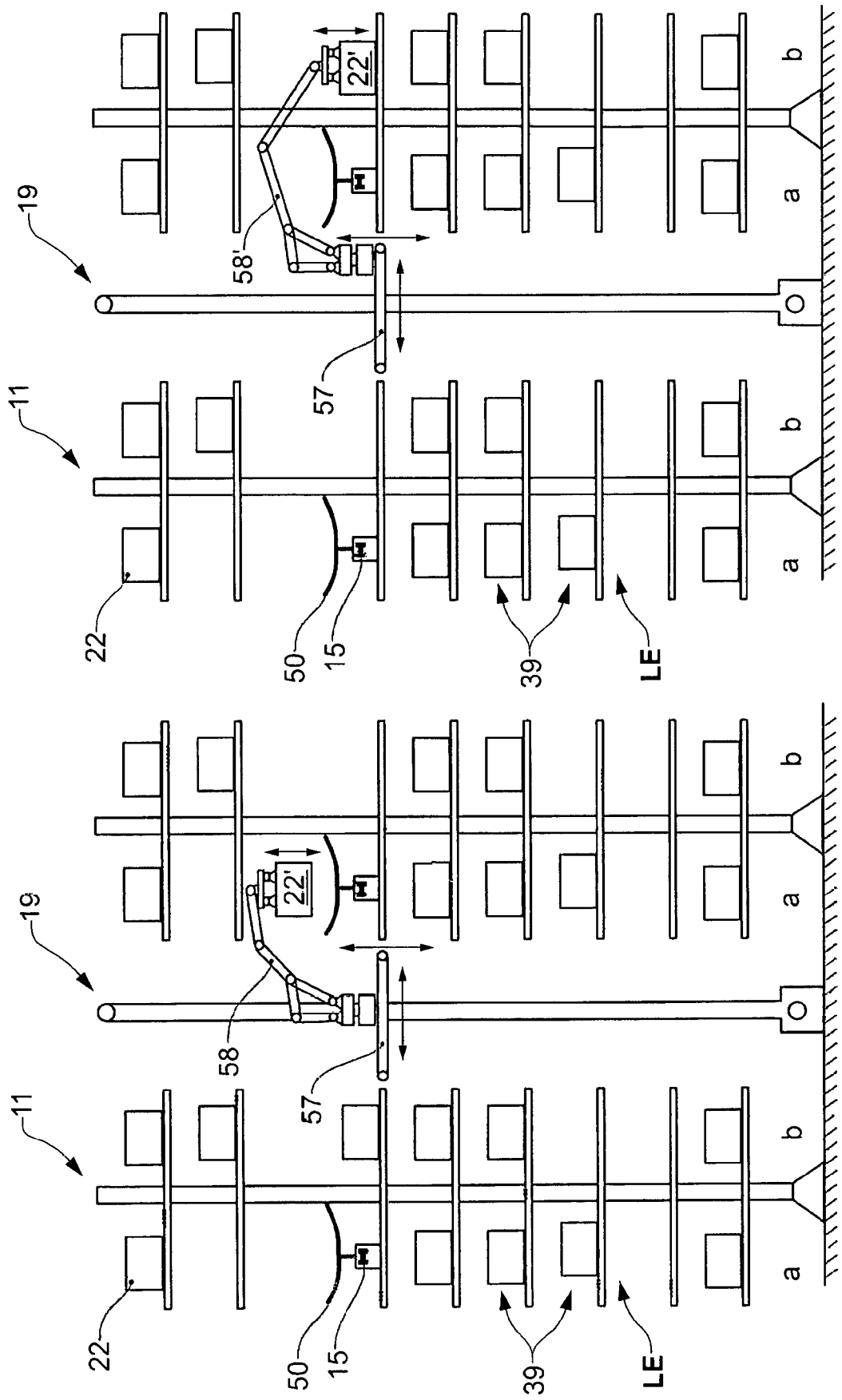
FIG. 9A schematically shows the removal of a storage container by a transfer device designed as a robotic device.
FIG. 9B schematically shows the storage of a storage container by a further transfer device designed as a robotic device.

FIG. 9A shows a storage system according to the invention in which, for handling the objects to be stored and retrieved, the transfer device, 57 includes a robotic device 58 (schematically illustrated) that is transversely movable with respect to the rack aisle, with an extension arm and a gripping device for gripping and positioning a storage container. The robotic device may pick up storage containers 22' from a transport tray 50 of the conveyor 15 or deposit them in same. Similarly, the rack storage and retrieval unit 19, using the robotic device, may pick up and deposit storage containers 22 at the desired positions of the high rack to the left and right of the rack aisle. Since in this embodiment of the invention, besides the conveyor there is no need for space for temporarily storing storage containers to be loaded or unloaded, all storage areas of the high rack are usable. It may be necessary, depending on the geometry of the robotic device, in the storage level of the conveyor to select the distance from the next-higher storage level to be greater than for the other storage levels.

FIG. 9B shows another embodiment of a storage system according to the invention, in which the extension arm of the robotic device 58 has a longer design than in FIG. 9A. The longer extension arm in combination with the transversal movability of the robotic device makes it possible, as shown in FIG. 9B, to also reach the storage container 22' on side b of the right high rack, facing away from the side of the transfer device 57, or to reach the conveyor 15 on the oppositely facing left side a of the left high rack. This allows even more flexible and efficient access to the high rack, since, for example, individual storage containers may be transferred across three rack aisles, and the transfer unit 57 of a rack aisle has access in each case to two partial segments of the conveyor 15.

Figure 10:
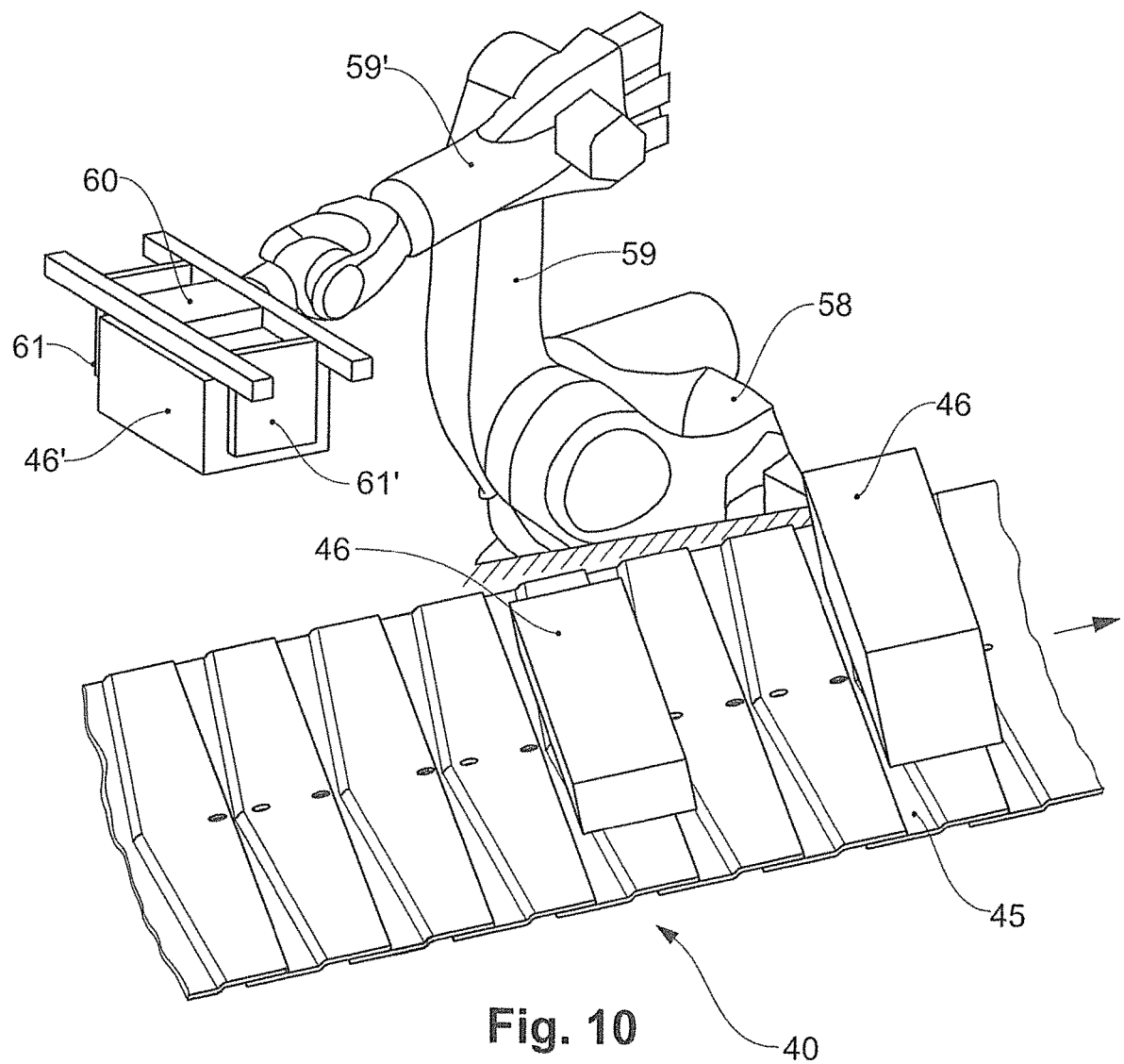
FIG. 10 shows a robotic gripping device fastened to a transfer unit according to one embodiment of the invention.

Yet another embodiment variant is illustrated in FIG. 10. A robotic device 58 of the transfer device of a rack storage and retrieval unit includes a multipart working arm 59, 59' that is pivotable via articulated joints, with a gripping device 60 situated on the distal end thereof, for cube-shaped objects such as packages 46, 46'. The merely schematically illustrated gripping device may laterally grasp, with two transversally movable gripping plates, a package 46' conveyed on the conveyor, configured in the form of a transport belt 40, in order to subsequently deposit the package at the desired location in the storage rack, or may grasp the package at the storage area in order to subsequently deposit it on the conveyor.

The scope of the present invention is not limited to the specific embodiments described herein. Rather, the description and the associated figures, in addition to the examples disclosed herein, result in various further modifications of the present invention for those skilled in the art, which likewise are encompassed by the protective scope of the claims. Furthermore, various references are cited in the description, the disclosed content of which is hereby fully incorporated by reference into the description.

It is claimed:

1. A storage system comprising:
a plurality of storage areas for receiving stored goods, wherein the storage areas are situated on superposed storage levels of high racks that are spaced apart from one another, thereby forming rack aisles;
wherein each high rack has two storage areas situated one behind the other, transverse to the rack aisle;
wherein horizontally and vertically movable rack storage and retrieval units are provided in the rack aisles, between the high racks, as handling devices with which each of the storage areas can be accessed for storing or retrieving stored goods;
wherein a conveyor for storing and retrieving the stored goods is provided, the conveyor forming a continuously closed loop which is led on at least one storage level of the superposed storage levels, and which is led at least once through the high racks, through an arrangement of the storage areas; and
wherein the conveyor is led on a particular storage level through a particular high rack, in parallel to the rack aisle, and in the particular storage level on which the conveyor is led through the particular high rack, only one row of storage areas is provided next to the conveyor.

2. The storage system according to claim 1, wherein the storage system includes at least one picking unit for individually combining retrieved stored goods, and the conveyor at the picking unit is led along or through the picking unit.

3. The storage system according to claim 2 wherein when the picking unit is not in use, a group of selected goods are stored along a length of the conveyor in a sequence until the group of selected goods is configured to be retrieved by the picking unit.

4. The storage system according to claim 2 wherein the at least one picking unit further comprises a plurality of picking stations for removing goods from a plurality of points along the continuously closed loop of the conveyor.

5. The storage system according to claim 1, wherein the storage system includes at least one transfer station for an intake of stored goods to be stored in the storage system, and the conveyor at the transfer station is led along or through the transfer station.

6. The storage system according to claim 5 wherein the at least one transfer station is configured to intake goods to be stored in a high rack of the storage system.

7. The storage system according to claim 1, wherein the storage levels through which the conveyor is led are situated at approximately one-half of a height of the high racks.

8. The storage system according to claim 1, wherein the handling device is designed and configured in such a way that the handling device is configured to pick up stored goods from each of the storage areas and transfer them to the conveyor.

9. The storage system according to claim 1, wherein for transferring stored goods from a handling device to the conveyor, at least one intermediate conveyor is provided which receives the stored goods from the handling device and further transports them on the conveyor.

10. The storage system according to claim 9, wherein the at least one intermediate conveyor is drivable.

11. The storage system according to claim 1, wherein the handling device is designed and configured in such a way that the handling device is configured to receive stored goods from the conveyor and transport them to each of the storage areas of the storage system and deposit them there.

12. The storage system according to claim 1, wherein the conveyor includes a continuously circulating conveyor chain that forms a continuously closed loop, to which devices for receiving stored goods are fastened.

13. The storage system according to claim 12, wherein the devices for receiving stored goods include plates situated on a top side of the conveyor chain, one behind the other in a running direction, of the conveyor chain, on which the stored goods are configured to be deposited for transport.

14. The storage system according to claim 12, wherein the devices for receiving stored goods include transport trays situated on a top side of the conveyor chain, one behind the other in a running direction of the conveyor chain, on which the stored goods may be deposited for transport.

15. The storage system according to claim 14, wherein the devices are designed in such a way that stored goods situated therein are unloadable transversely with respect to a conveying direction.

16. The storage system according to claim 15, wherein the transport trays are configured to be laterally tilted to unload the stored goods.

17. The storage system according to claim 14, wherein the devices are designed in such a way that stored goods situated therein are unloadable laterally with respect to a conveying direction.

18. The storage system according to claim 12, wherein the devices for receiving stored goods include plates situated on a top side of the conveyor chain, one behind the other in a running direction of the conveyor chain on which stored goods can be deposited for transport, and wherein the plates are adapted to at least partially overlap one another.

19. The storage system according to claim 18 wherein the plates are configured to rotate relative to one another.

20. The storage system according to claim 1 wherein the continuously closed loop of the conveyor is led through two or more high racks.

* * * * *